United States Patent
Sobczak et al.

(10) Patent No.: US 9,284,444 B2
(45) Date of Patent: Mar. 15, 2016

(54) NON-CEMENTITIOUS ORGANIC RENDER FORMULATION WITH IMPROVED WORKABILITY

(71) Applicant: Rohm and Haas Company, Philadelphia, PA (US)

(72) Inventors: Jeffrey J. Sobczak, Coatesville, PA (US); Mark D. Westmeyer, Collegeville, PA (US)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 14/563,030

(22) Filed: Dec. 8, 2014

(65) Prior Publication Data

US 2015/0159006 A1  Jun. 11, 2015

Related U.S. Application Data

(60) Provisional application No. 61/913,594, filed on Dec. 9, 2013.

(51) Int. Cl.

| | | |
|---|---|---|
| *C08L 33/08* | (2006.01) | |
| *C08F 265/06* | (2006.01) | |
| *C08F 8/44* | (2006.01) | |
| *C08L 51/06* | (2006.01) | |
| *B29B 9/12* | (2006.01) | |
| *C04B 24/26* | (2006.01) | |
| *B29K 33/04* | (2006.01) | |
| *B29L 31/00* | (2006.01) | |

(52) U.S. Cl.
CPC . *C08L 33/08* (2013.01); *B29B 9/12* (2013.01); *C04B 24/2641* (2013.01); *C08F 8/44* (2013.01); *C08F 265/06* (2013.01); *C08L 51/06* (2013.01); *B29K 2033/04* (2013.01); *B29L 2031/00* (2013.01)

(58) Field of Classification Search
CPC ........... C08L 33/08; C08L 51/06; B29B 9/12; C04B 24/26; C08F 265/06; C08F 8/44; B29K 2033/04; B29L 2031/00
USPC ......................................................... 524/523
See application file for complete search history.

(56) References Cited

U.S. PATENT DOCUMENTS

| | | |
|---|---|---|
| 3,994,980 A | 11/1976 | Kubicek |
| 4,916,171 A | 4/1990 | Brown et al. |
| 5,403,894 A | 4/1995 | Tsai et al. |
| 5,604,272 A | 2/1997 | Penzel et al. |
| 5,705,553 A | 1/1998 | Kuropka |
| 5,744,540 A * | 4/1998 | Baumstark ............ C04B 24/26 524/460 |
| 5,753,036 A | 5/1998 | Hornaman et al. |
| 5,872,189 A * | 2/1999 | Bett .................... C08F 279/02 525/243 |
| 5,908,877 A | 6/1999 | Ci et al. |
| 6,765,072 B1 | 7/2004 | Willimann et al. |
| 8,497,315 B2 | 7/2013 | Willimann et al. |
| 2008/0269390 A1 | 10/2008 | Weitzel |

FOREIGN PATENT DOCUMENTS

| | | | |
|---|---|---|---|
| EP | 0013836 A1 | 8/1980 | |
| WO | 2012007529 A2 | 1/2012 | |
| WO | 2012024214 A1 | 2/2012 | |
| WO | 2013134208 A1 | 9/2013 | |
| WO | WO 2013134208 A1 * | 9/2013 | .......... C04B 24/2641 |
| WO | 2014099574 A1 | 6/2014 | |

* cited by examiner

*Primary Examiner* — Michael M Bernshteyn
(74) *Attorney, Agent, or Firm* — Andrew E. C. Merriam

(57) ABSTRACT

The present invention provides dry mix compositions and dry compositions of calcium methacrylate salt containing multi-stage acrylic copolymer RDP and dry anionic associative thickeners for use in the dry mix compositions so that when wet to make cement, mortar or trowellable compositions for use in Exterior Insulation Finishing Systems (EIFS), the compositions exhibit improved workability in both cementitious and non-cementitious dry mixes.

11 Claims, No Drawings

NON-CEMENTITIOUS ORGANIC RENDER FORMULATION WITH IMPROVED WORKABILITY

The present invention relates to water redispersible polymer powder (RDP) compositions, more particularly, it relates to RDP compositions of a multi-stage acrylic polymer RDP and a dry anionic associative thickener for use in non-cementitious exterior insulation and finish systems (EIFS) compositions such as textured paints, and cementitious tile adhesives or formulations for basecoats in EIFS, and to methods of making and using the same.

Multi-layered exterior wall systems such as exterior insulation and finish systems (EIFS) are used extensively as exterior wall surfaces in commercial and residential buildings. Such multi-layered systems are conventionally prepared by covering a substrate such as plywood or gypsum board with a layer of insulation material, covering the insulation material with a cementitious basecoat which is embedded with a reinforcing mesh and finishing with a non-cementitious topcoat or exterior finishing composition which is typically applied with a trowel to form a layer with a thickness of from 0.1 to 2.5 cm. Such exterior finishing compositions not only provide insulation but also act as a barrier to moisture ingress and provide a decorative function. However, for use in exterior applications, non-cementitious compositions must have excellent workability.

RDP containing dry mix compositions for use in external finishing compositions are disclosed, for example, in WO2012/024214, to Lefevre et al., which provides an RDP composition comprising a blend of two polymers, at least one of which is capable of providing a desired texture. The disclosure mentions working time limitations of dry mix finishes. The disclosed RDP compositions seek to enable non-cementitious EIFS topcoat compositions for greater product flexibility, pigmentability and texturizing properties. However, the RDP compositions disclosed in this disclosure are described by resort to tradenames and marks which are used to identify sources of polymers, but not to define the polymers themselves; and no disclosure calls out any specific compositions. Thus, the scope of the compositions disclosed appears to be practically unlimited, but not defined. Overall, the Lefevre et al. disclosure provides no improvement other than inclusion of a texture forming polymer into an RDP powder composition and leads one to expect no improvement in the workability of a wet EIFS topcoat composition made therefrom.

The present inventors have endeavoured to find an easily stored and transported dry mix composition or powder that offers equivalent performance to existing liquid topcoat compositions without the workability problems found in known dry mix compositions.

STATEMENT OF THE INVENTION

1. In accordance with the present invention, shelf-stable compositions for use in dry mix applications comprise a water redispersible polymer powder (RDP) composition containing B) a multi-stage acrylic copolymer RDP and A) from 0.1 to 7.5 wt. % or, preferably, from 0.25 to 2 wt. %, based on the total weight of A) and B), of a dry anionic associative thickener chosen from a hydrophobically modified alkali swellable acrylic emulsion copolymer (HASE), an alkali swellable acrylic emulsion copolymer, and mixtures thereof, the multi-stage acrylic copolymer RDP B) having a calcium methacrylate salt group containing alkali-soluble resin outer stage and one or more inner stage, the RDP further containing each of one or more nucleating agent having a boiling point of 150° C. to 500° C. and a water solubility of 3.5% or less, and one or more colloidal stabilizer, preferably, poly(vinyl alcohol) (PVOH), wherein when the multi-stage acrylic copolymer is dispersed in water the one or more inner stage comprises an acrylic (co)polymer having a glass transition temperature (Tg) of from −10 to 15° C., or preferably, −5 to 5° C., calculated using the Fox equation and wherein the weight ratio of the alkali-soluble resin outer stage to the one or more inner stage(s) range from 1:19 to 2:3, or, preferably, from 1:19 to 1:4, further wherein the dry anionic associative thickener, the colloidal stabilizer, the nucleating agent and the multi-stage acrylic copolymer are contained in the same particle.

2. The composition in accordance with 1, above, wherein the A) dry anionic associative thickener is chosen from a hydrophobically modified alkali swellable acrylic emulsion copolymer (HASE), such as, for example, those containing, in copolymerized form, from 20 to 69.5 wt. % of at least one of methacrylic acid and acrylic acid, from 0.5 to 25 wt. % of at least one monomer of the formula H2C=C(R)—C(O)—O—(CH2CH2O)$_n$R' (I) wherein R is H or CH3, n is at least 2 and R' is a radical having from 8 to 30 carbon atoms and is at least one of substituted or unsubstituted alkyl, alkylaryl, and polycyclic alkyl, preferably, $C_{12}$ to $C_{18}$ alkyl, from 30 to 79.5 wt. % of at least one alkyl acrylate and/or alkyl methacrylate in which the alkyl group has from 1 to 4 carbon atoms, and from 0 to 1.0 wt. % of a polyethylenically unsaturated monomer, such as, for example, allyl methacrylate, a glycol di(meth)acrylate or a polglycol di(meth)acrylate or diallyl phthalate, all wt. % s based on the total weight of the monomers used to make the copolymer, an alkali swellable acrylic emulsion copolymer, such as, for example, those containing, in copolymerized form, from 15 to 40 wt. % of acrylic acid or methacrylic acid, from 59 to 84.95 wt. % of a ($C_2$-$C_8$) alkyl acrylate, and from 0.01 to 1 wt. %, or, preferably, 0.05 to 0.8 percent by weight of a polyethylenically unsaturated monomer, such as, for example, allyl methacrylate, a glycol di(meth)acrylate or a polglycol di(meth)acrylate or diallyl phthalate, all wt. % s based on the total weight of the monomers used to make the copolymer, and mixtures thereof.

3. The composition in accordance with 1 or 2, above, wherein the B) multi-stage acrylic copolymer RDP contains, in copolymerized form, a crosslinking agent, such as, for example, allyl methacrylate (ALMA), methacryloxypropyltrimethoxysilane (MATS), butylene glycol dimethacrylate, and acetoacetoxy ethyl methacrylate (AAEM) in the range of 0 to 2.0% wt. %, such as 0.05 wt. % or more, or, preferably, from 0.25 to 1.0 wt. %, based on the total weight of the monomers used to make the copolymer.

4. The composition in accordance with 1, 2 or 3, above, wherein the B) multi-stage acrylic copolymer RDP contains a chain transfer agent residue, such as, for example, n-dodecyl mercaptan (nDDM) or methyl wt. % mercaptopropionate (MMP), in the range of from 0.05 to 1.0 wt. %, or, preferably, from 0.25 to 0.75 wt. %, based on the total weight of the monomers and chain transfer agents used to make the copolymer.

5. The composition in accordance with 1, 2, 3 or 4, above, wherein the B) multi-stage acrylic copolymer RDP contains from 0.1 to 30 wt. % of the one or more colloidal stabilizer, per 100 weight parts multi-stage acrylic copolymer solids.

6. The composition in accordance with 1, 2, 3, 4 or 5, above, wherein the B) multi-stage acrylic copolymer RDP further comprises one or more hydrophobic agent, such as, for example, sodium oleate or sodium lauryl sulfate in the range 0.5 to 10 wt. %, based on dry multi-stage acrylic copolymer solids.

7. The composition in accordance with 1, 2, 3, 4, 5, or 6, above, wherein the B) multi-stage acrylic copolymer RDP further comprises one or more anti-caking aid, such as, for example, nepheline syenite, kaolin clay, silica, dolomite, talc, calcium carbonate or mixtures thereof.

8. The composition in accordance with any one of 1 to 7, above, further comprising an inorganic dry material chosen from a cementitious material and a non-cementitious material. Such a composition may have a percent pigment volume concentration (% PVC) of from 50-99% or, 98% or less, or, preferably, from 65-85%.

9. The composition in accordance with 8, above, wherein the inorganic dry material is non-cementitious and the composition comprises from 40 to 80 wt. % of silicon dioxide, aggregate, sand or their mixtures, from 0 to 10 wt. % of one or more extender, c) from 0 to 10 wt. % of one or more pigments, such as titanium dioxide, from 10 to 20 wt. % of the B) multi-stage acrylic copolymer RDP and from 0.1-3.0% of the A) dry anionic associative thickener, all wt. % s based on the total weight of the composition.

10. In another aspect of the present invention, methods of making a water redispersible polymer powder for use in dry mix applications comprise providing an aqueous dispersion containing one or more colloidal stabilizer, preferably, PVOH, and a multi-stage acrylic copolymer having an alkali-soluble resin outer stage comprising methacrylic acid groups and one or more inner stage, one or more nucleating agent having a boiling point of 150° C. to 500° C. and a water solubility of 3.5% or less, wherein when the multi-stage acrylic copolymer is dispersed in water the one or more inner stage comprises an acrylic (co)polymer having a glass transition temperature (Tg) of from −10 to 15° C., or preferably, −5 to 5° C., calculated using the Fox equation, and atomizing the resulting composition, such as, for example, by spray drying, in the presence of from 0.75 to 3 wt. %, or, preferably, from 1.0% to 2.4 wt. % of calcium hydroxide or aqueous lime, based on the total weight of the RDP solids, to form a water redispersible polymer powder, providing separately an aqueous mixture of an anionic associative thickener chosen from a hydrophobically modified alkali swellable acrylic emulsion copolymer (HASE), an alkali swellable acrylic emulsion copolymer, or mixtures thereof in the amount of from 0.1 to 7.5 wt. % or, preferably, from 0.25 to 2 wt. %, based on the total weight of solids in the aqueous mixture and the aqueous dispersion, atomizing the aqueous mixture to form a dry anionic associative thickener and blending the dry anionic associative thickener and the water redispersible polymer powder.

11. According to yet another aspect, the present invention provides methods of using the compositions of any of 8 or 9, above, comprising adding water to the composition to form a trowelable composition, applying the trowelable composition to a substrate and drying or allowing the applied composition to dry.

Throughout the specification, any reference to percent or percent weight etc. is expressed in terms of dry weight of the composition unless otherwise specified. Further, all ranges recited in the specification are inclusive and combinable.

Unless otherwise indicated, all temperature and pressure units are room temperature and standard pressure.

All phrases comprising parentheses denote either or both of the included parenthetical matter and its absence. For example, the phrase "(meth)acrylate" includes, in the alternative, acrylate and methacrylate.

As used herein the term "acrylic" refers to polymers that comprise the polymerization product of monomer mixtures containing more than 50 wt. %, based on total monomer solids, of any acrylic monomers such as, for example, acrylates, methacrylates, (meth)acrylamides, and (meth)acrylic acids.

As used herein, unless otherwise indicated, the phrase "average particle size", of a water redispersible polymer powder particle refers to the particle diameter or the largest dimension of a particle in a distribution of powder particles as determined by laser light scattering such that 50 wt. % of the particles in the distribution are smaller than the particle and 50 wt. % of the particles in the distribution are larger than the particle. For redispersed particles, the particle size distribution was measured using a Coulter™ LS 230 particle size analyzer (Beckman Coulter, Brea, Calif.) per manufacturer's recommended Procedures via laser scattering. The scattering light from particles through laser scattering and polarization intensity differential scattering is collected as a function of angle, and subsequently converted to a particle size distribution. As used herein, unless otherwise indicated, the term "average particle size" for latex or emulsion particles refers to a weight average particle size measured via dynamic light scattering using a Brookhaven Instruments Corporation 90PLUS™ Particle Size Analyzer (Holtsville, N.Y.) per manufacturer's recommendations.

As used herein, the term "dry mix" refers to any dry composition which remains free flowing when dry and does not react until it is exposed to moisture.

As used herein, unless otherwise indicated, the term "Glass transition temperature" or "$T_g$" is the glass transition temperature of a copolymer calculated using the Fox equation (Bulletin of the American Physical Society 1, 3 Page 123 (1956)), as follows:

$$1/T_g = w_1/T_{g(1)} + w_2/T_{g(2)}$$

For a copolymer, $w_1$ and $w_2$ refer to the weight fraction of the two monomers, based on the weight of monomers charged in the reaction vessel, and $T_{g(1)}$ and $T_{g(2)}$ refer to the glass transition temperatures of the two corresponding homopolymers in degrees Kelvin. For polymers containing three or more monomers, additional terms ($w_n/T_{g(n)}$) are added. The glass transition temperatures of the homopolymers for suitable monomers useful in the present invention are reported in "Polymer Handbook", edited by J. Brandrup and E. H. Immergut, Interscience Publishers, 1966.

As used herein, the term "measured $T_g$" refers to that value measured by differential scanning colorimetry (DSC), wherein the polymer is prepared and maintained in the absence of ammonia or primary amine, and is then dried, preheated to 120° C., rapidly cooled to −100° C., and then heated to 150° C., at a rate of 20° C./minute while data is collected. The glass transition temperature for the polymer is measured at the midpoint of the inflection using the half-height method.

As used herein, unless otherwise indicated, the phrase "molecular weight" refers to the weight average molecular weight as measured by gel permeation chromatography (GPC) against a set of poly(styrene) standards of a size sufficiently small (i.e. low enough MW) to resolve the molecular weight of the analyte.

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer. Thus, the term "polymer" includes copolymers and polymers within its scope.

As used herein, the term "% PVC" means the amount given by the equation:

$$\text{PVC (\%)} = V_{pigment}/(V_{pigment} + V_{binder}) \times 100,$$

wherein $V_{pigment}$ represents the volume of pigment within the composition, and $V_{binder}$ represents the volume of polymeric binder within the composition.

As used herein, the terms "water redispersible polymer powder", "redispersible polymer powder" and "RDP" are used interchangeably and refer to a polymer-containing powder which may readily be dispersed into deionized water to provide a particle size distribution of the original particle size of the latex or emulsion polymer used to make the powder.

As used herein, the term "substantially free of surfactants" means a composition that contains less than 5000 ppm of surfactant, based on the total weight solids of the composition, or, preferably, less than 2500 ppm.

As used herein, the term "water solubility" refers to the amount of a given material that visibly dissolves in water at room temperature, expressed as a percentage of the total weight or mass of water used. So, for example, if 5 grams of a material would dissolve in 100 g of water, the water solubility of that material is 5%.

As used herein, the term "non-cementitious" refers to inorganic compositions which are substantially free of calcium silicate containing materials which react with water and harden to produce a water insoluble material.

As used herein, the term "cementitious" refers to hydraulically curing inorganic compositions that have alkali silicates, such as Portland cement.

As used herein, the term "substantially cement free" means less than 5 wt. %, preferably less than 2 wt. %, and more preferably less than 1 wt. % of cement, based on the total dry weight of the exterior finishing composition.

As used herein, unless otherwise specified, the phrase "wt. %" stands for weight percent and is expressed in terms of dry weight or solids. The term "solids" excludes volatiles and water.

The present inventors have discovered that dry anionic associative thickeners in multi-stage acrylic copolymer water redispersible polymer powders provide equivalent workability and ease of use as a wet emulsion polymer formulation when used in making non-cementitious topcoats for exterior insulation and finish systems. Such a result was achieved by adding lime powder $(Ca(OH)_2)$ to the precursor latex of the multi-stage acrylic copolymer aqueous dispersion and the anionic associative thickener prior to drying it. The resulting spray dried product has a desirable combination of scrub resistance and workability. The calcium methacrylate salt group containing multi-stage acrylic copolymer RDPs are free flowing and storage stable and provide enhanced performance when used in making non-cementitious topcoats for exterior insulation and finish systems. The workability of an EIFS or stucco formulation improves with increasing alkali swellable portion of the shell of the multi-stage acrylic copolymer from which the RDP is derived and including the anionic associative thickener. Further, incorporation of dry anionic associative thickeners enables wider latitude in acceptable workability with water addition levels, whereas excessive water could more easily render formulations that exhibit poor trowellability, poor float behavior, or poor applicability of texture.

Anionic associative thickeners suitable for use in the present invention may be chosen from alkali soluble emulsions (ASE), or hydrophobically modified alkali swellable acrylic emulsion copolymer (HASE), such as those sold as Acrysol™ ASE-60, TT-615, Rheolate™ 101 (Dow, Midland, Mich.). Such dry anionic associative thickeners may be, for example, those described in EP patent publication no. EP13836 to Chang et al., or U.S. Pat. No. 3,994,980 to DeTommaso.

The methods of making the compositions of the present invention include both atomizing the anionic associative thickener with the multi-stage acrylic copolymer aqueous dispersion to make an RDP composition, or atomizing the anionic associative thickener separately and adding it to water redispersible polymer powder RDP composition.

The dry anionic associative thickener improves workability if used in the disclosed amount. However, including too much (>2 wt. %, based on solids of the total dry mix, including inorganic materials) of the dry anionic associative thickener in a dry mix composition will deter weatherability or washout resistance of materials containing the compositions.

The multi-stage acrylic copolymer RDP of the present invention comprises a colloidal stabilizer. Preferably, the RDP comprises a colloidal stabilizer. The colloidal stabilizer can be present in an amount from 0.1 to 30 wt. %, or, preferably, up to 20 wt. %, or, more preferably in an amount from 2.0 to 10.0 wt. %, based on the total dry weight of the RDP.

Preferably, to avoid the use of excess surfactant, at least a portion of the total amount of colloidal stabilizer within the multi-stage acrylic copolymer RDP is present during polymerization of the carboxyl group-containing multi-stage acrylic copolymer. Preferably, the total amount of colloidal stabilizers included within the RDP is added during polymerization of the carboxyl group-containing multi-stage acrylic copolymer. Preferably, the RDP comprises a colloidal stabilizer in an amount from 0.05 to 15 wt. %, based on the total weight of monomer solids. More preferably, the colloidal stabilizer is added in an amount from 0.1 to 15 wt. %, even more preferably from 2.0 to 4.0 wt. %. Anionic and non-ionic surfactants may also be used in polymerization in amounts of less than 0.5 wt. % of the total water redispersible polymer powder solids.

Preferably, the colloidal stabilizer used in the present invention is selected from: polyvinyl alcohols (PVOH) of various known molecular weights and degrees of hydrolysis, e.g. partially hydrolysed polyvinyl alcohols; chelating agents, such as, for example, ethylenediamine tetraacetate; polyacrylamides; polyvinylpyrrolidones; polysaccharides; polyvinyl sulfonic acid; cellulose; cellulose ethers; polyesters; and mixtures thereof. Most preferably the colloidal stabilizer is PVOH.

The multi-stage acrylic copolymer RDP of the present invention comprises a nucleating agent. Suitable nucleating agents include any compound having a boiling point of at least 150 t, preferably at least 200° C., and a maximum of 500° C., preferably a maximum of 400° C., and a water solubility of 3.5% or less, preferably 1.0% or less, more preferably 0.5% or less. However, to ensure that the nucleating agent is within the RDP, the nucleating agent should not be volatile under the RDP processing conditions. Preferably, the total amount of nucleating agent within the RDP is present during polymerization of the carboxyl group-containing multi-stage acrylic copolymer. Preferably, the acrylic copolymer comprises from 0.1 to 4.0 wt. %, more preferably from 0.5 to 3.0 wt. %, still more preferably from 1.0 to 2.0 wt. % of the nucleating agent(s). These nucleating agents are preferably included during the first stage of copolymerisation of the multi-stage carboxyl-group containing acrylic polymer or prior to or during polymerising to form the alkali soluble resin stage.

Suitable nucleating agents may be selected from $C_3$ to $C_{10}$ alkyl glycol ethers; phenyl glycol ethers, such as ethylene glycol phenyl ether; $C_3$ to $C_{10}$ alkyl diglycol ethers, such as dipropylene glycol n-butyl ether; $C_3$ to $C_{10}$ alkylaryl glycol ethers, such as ethylene glycol octylphenyl ether; $C_3$ to $C_{10}$ alkylaryl diglycol ethers, such as dipropylene glycol butylphenyl ether; $C_3$ to $C_{10}$ alkyl esters of $C_3$ to $C_9$ alkanoic acids, such as alkyl isobutyrates and branched alkyl isobutyrates, like 2,2,4-trimethyl-1,3-pentanediol monoisobutyrate; $C_3$ to $C_{10}$ alkyl esters of $C_3$ to $C_9$ alkanedioic acids, such as butyl succinate; $C_3$ to $C_{10}$ alkyl diesters of $C_3$ to $C_9$ alkanoic acids, such as 2,2-dimethyl-1-methylethyl-1,3-propanediylbis-2-methyl propionate; and $C_3$ to $C_{10}$ dialkyl esters of $C_3$ to $C_9$ alkanedioic acids, such as diisobutyl glutarate, diisobutyl succinate, diisobutyl adipate; and mixtures thereof. Preferably, the nucleating agent is selected from linear or branched alkyl isobutyrates. Examples of suitable nucleating agents are shown in Table 1, below.

TABLE 1

| Nucleating Agent | BP (° C.) | $H_2O$ Solubility |
|---|---|---|
| 2,2-dimethyl-1-methylethyl-1,3-propanediyl bis-2-methyl propionate | 344 | Negligible |
| diisobutyl glutarate (55-65%); diisobutyl succinate (15-25%); diisobutyl adipate (10-25%) | 274-289 | Negligible |
| ethylene glycol phenyl ether (DALPAD ™, [1] A) | 244 | 2.5% |
| ethylene glycol phenyl ether (DOWANOL ™, [1] EPh) | 244 | 3.1% |
| 2,2,4-trimethyl-1,3-pentanediol monoisobutyrate | 254 | 0.1% |
| propylene glycol phenyl ether | 243 | 2.0% |
| dipropylene glycol n-butyl ether | 230 | 4.5% |
| ethylene glycol octylphenyl ether | 250 | Negligible |

[1] Dow Chemical Co., Midland, MI

Preferably, the multi-stage acrylic copolymer of the present invention comprises, in polymerized form, from 0.1 to 20 wt. %, based on the total weight of monomers used to make the copolymer, of methacrylic acid or methacrylic acid with up to 5 wt. %, based on the total weight of monomers used to make the copolymer, of another carboxyl group containing monomer. More preferably, the copolymer comprises, in copolymerized form, from 0.5 to 5.0 wt. %, still more preferably, from 1.0 to 3.5 wt. % of methacrylic acid, based on the total weight of monomers used to make the copolymer.

Suitable carboxyl containing monomers include acrylic acid, methacrylic acid, itaconic acid, maleic acid, fumaric acid, acrylic anhydride, methacrylic anhydride, half esters of maleic anhydride/fumaric/itaconic, maleic anhydride, and itaconic anhydride. Preferably, the carboxyl containing monomer is (meth)acrylic acid.

The multi-stage acrylic copolymer comprises an alkali-soluble resin outer stage and one or more inner stage(s). The relative proportion, expressed in terms of a weight ratio, of the alkali-soluble resin outer stage to the one or more inner stage(s) is from 1:19 to 2:3. Preferably, the weight ratio of the alkali-soluble resin outer stage to the one or more inner stage(s) is from 1:19 to 1:4, still more preferably from 1:19 to 3:17.

The multi-stage acrylic copolymers of the present invention form a core/shell structure in water with the alkali-soluble resin stage located on the outside of the polymer particle, either as a result of grafting or physiadsoprtion. Thus, the carboxyl groups in the copolymer are located at the surface of the redispersible copolymer powder particles. The inclusion of a nucleating agent helps to ensure coverage of the inner stage(s) of the multi-stage acrylic copolymer particle with the alkali soluble resin and, thus, improves the colloidal stabilization of the core. In addition, reducing or eliminating the surfactant requirement from the multi-stage copolymer production enables a relatively larger particle size alkali soluble resin which helps to colloidally stabilize the inner stage(s) of the acrylic copolymer in the RDP.

The multi-stage acrylic copolymers of the present invention are produced using conventional emulsion copolymerisation techniques, such as is described in U.S. Pat. No. 5,403,894, except that copolymerization to from the alkali soluble resin takes place in the presence of a nucleating agent and, preferably, in a polymerization mixture that is substantially free of surfactants. Conventional thermal polymerization initiators such as persulfate salts, and/or redox initiators, such as peroxides with bisulfite salts may be used.

In general, two copolymerization techniques may be used; and all but one polymerization stage comprises a polyfunctional monomer to graft together the polymer stages. Technique one comprises emulsion polymerizing a monomer mixture of an ethylenically unsaturated carboxylic acid or anhydride and one or more non-ionic monomer, such as an alkyl(meth)acrylate, styrene, alkyl substituted styrene, (meth)acrylamide, or hydroxyalkyl(meth)acrylate, in the presence of a polyfunctional monomer to form an alkali soluble resin, neutralizing the alkali soluble resin with an amine base and, in a second stage, forming a monomer mixture of one or more non-ionic monomer, combining the second-stage monomers with the alkali soluble resin and polymerizing the monomer mixture to form the copolymers of the present invention. In one variation of this technique, the polyfunctional monomer is part of the second stage monomer mixture, not the monomer mixture that forms the alkali soluble resin, and is polymerized in the presence of the neutralized alkali soluble resin to form the inner stage polymer.

A second polymerization technique, as described in U.S. Pat. No. 4,916,171, comprises emulsion polymerizing a monomer mixture of one or more non-ionic monomer in the presence of a polyfunctional monomer to form an inner stage polymer and, in a subsequent stage, forming a monomer mixture of an ethylenically unsaturated carboxylic acid or anhydride and one or more nonionic monomer and combining the monomer mixture with the inner stage and polymerizing the mixture to form the copolymer. So long as there is one alkali soluble resin stage, additional nonionic monomer stages may be copolymerized along with the addition of a polyfunctional monomer to make multi-stage copolymers. In polymerization, the temperature in each stage may range from 20 to 105° C., or, preferably from 50 to 95° C.

The resulting weight ratio of the total solids of the one or more inner stage copolymers to the alkali soluble resin polymer may range from 19:1 to 3:2, or, preferably 19:1 to 1:4, or, more preferably, from 19:1 to 3:17. In any polymerization, the initial stage may be formed by seed polymerization according to conventional methods.

Suitable non-ionic monomers for the preparation of the multi-stage acrylic copolymers may be chosen from ethyl acrylate, butyl acrylate, 2-ethylhexyl acrylate, methyl methacrylate, ethyl methacrylate, butyl methacrylate, methylolated (meth)acrylamide and methyl methacrylamide, hydroxyethyl(meth)acrylate. Nonionic monomers should comprise 5 wt. % or less of any hydroxyalkyl or methylolated monomer or amide group containing monomer. The selection of nonionic monomers that give a polymer stage having a desired Tg is conventional in the art.

Suitable polyfunctional monomers may be from (a) multi-ethylenic monomers having two or more sites of unsaturation, such as, for example, allyl-, methallyl-, vinyl-, dicylopentenyl and crotyl-esters of acrylic, and methacrylic acids, divinyl benzene, (poly)glycol di(meth)acrylates, such as, diethyleneglycol dimethacrylate; and polyol poly(meth)acrylates, such as trimethylolpropane trimethacrylate; (b) reactive chain transfer agents having two or more abstractable atoms, such as, for example, bromotrichloromethane; bromoform;

carbon tetrachloride; and carbon tetrabromide; and (c) hybrid polyfunctional monomers having one or more sites of unsaturation and one or more abstractable atoms, such as, for example, allyl-, methallyl-, and crotyl-mercaptan; vinyl ethers and vinyl thioethers of cycloalkenols and cycloalkene thiols. Preferred polyfunctional monomers include allyl or methallyl(meth)acrylate, N-methallyl vinyl-amides of acrylic acid and methacrylic acid; and allyl-mercaptan. Useful amounts of polyfunctional monomers range from 0.01 to 5 wt. %, based on the total weight of monomers in the monomer mixture in which they are used, or, preferably, from 0.25 to 3.0 wt. %.

The multi-stage acrylic copolymer RDP of the present invention may comprise other polymers blended with the multi-stage acrylic copolymer as long as the amount, in copolymerized form, of methacrylic acid, based on the total weight of the total polymer solids, remains from 0.1 to 20 wt. %. Such other polymers may be, for example, any nonionic (co)polymer, such as a polyolefin, olefin-vinyl ester, for example, ethylene-vinyl acetate, alkyl(meth)acrylates, styrene, or styrene acrylic copolymers. The blends may comprise from 20 to 80 wt. %, or, preferably, from 30 to 70 wt. % or, more preferably, from 40 to 60 wt. % of such nonionic (co)polymers, based on total polymer solids in the RDP.

The multi-stage acrylic copolymer RDP of the present invention may comprise polymers that are the addition copolymerisation product of from 0.001 to 5 wt. %, or, preferably, 0.1 to 1.0 wt. %, based on the total weight of monomers used to make the copolymer of a silyl group containing monomer, such γ-methacryloyloxypropyl trimethoxy silane or vinyl trialkoxy silanes or a benzophenone containing monomer, such as vinyl benzophenone.

Preferably, the RDP compositions further comprise an anti-caking agent. If present, the total amount of anti-caking agent included in the composition ranges is from 3.0 to 30.0 wt. %, preferably from 8.0 to 15.0 wt. %, based on the total dry weight of the multi-stage acrylic copolymer RDP. Preferably, the anti-caking agent is selected from kaolin clay, alumina silicate, dolomite, calcium carbonate, dolomite, silicate minerals and blends thereof. More preferably, the anti-caking agent is selected from kaolin clay, alumina silicate and combinations thereof. Preferred alumina silicates are MINEX™ Industrial Grade Nos. 16 to 60 (approximate mesh size), i.e. compositions comprising silicon dioxide, aluminium oxide, iron oxide and sodium oxide, calcium oxide, magnesium oxide and sodium oxide having a mesh particle size of less than 1.18 mm (#16), preferably less than 150 μm (#60).

In addition, the multi-stage acrylic copolymer RDP may comprise other conventional additives such as, for example, antifoaming agents, typically present in an amount of up to 1.5 wt. %, based on total solids. Other additives that may be employed, in conventional amounts, include one or more salts, such as $CaCl_2$, $MgCl_2$, monosaccharides, disaccharides, dispersants or superplasticizers.

The RDP compositions of the present invention may be formed by atomizing to dry an aqueous dispersion mixture comprising the multi-stage acrylic copolymer, aqueous lime or calcium hydroxide, and, if desired, additional colloidal stabilizer and/or optional components e.g. an anti-caking agent to form an RDP, and, separately, atomizing an aqueous anionic associative thickener, followed by blending the RDP and dry anionic associative thickener. Preferably, drying the aqueous mixture comprises spray drying. Spray drying can be carried out in customary spray drying plants, with atomization being carried out by means of single-fluid, two-fluid or multifluid nozzles or a rotary disc atomizer. In general, air, nitrogen or nitrogen enriched air may be employed as the drying gas, the inlet temperature of the drying gas generally not exceeding 200° C., preferably from 110° C. to 180° C., more preferably from 130° C. to 170° C. The outlet temperature may generally be from 45° C. to 120° C., preferably from 60° C. to 90° C., depending on the plant, the Tg of the resin and the desired degree of drying. In one example, the viscosity of the feed to be spray-dried may be adjusted via the solids content so that a value of less than 1000 mPas (Brookfield viscosity at 20 rpm and 23° C.), preferably less than 250 mPas, is obtained. The solids content of the admixture to be spray-dried may generally be from 25% to 60% by weight, preferably from 35% to 50% by weight, based on the total weight of the dispersion.

The amount of calcium hydroxide or aqueous lime used in the methods of making the RDP of the present invention may be expressed by a calcium hydroxide or lime to methacrylic acid weight ratio of from 0.7:1 to 2.6:1, or preferably, from 0.7:1 to 1.23:1, wherein the weight of the methacrylic acid is the amount of the methacrylic acid used to make the multi-stage acrylic copolymer.

The RDP compositions of the present invention have a variety of uses, including as functional additives in a wide range variety of compositions such as in non-cementitious exterior finishing compositions such as, for example, a textured and, optionally, pigmented topcoat formulation for use in an exterior insulation and finish system (EIFS); and in cementitious tile adhesives and EIFS basecoat compositions.

As used herein, "aggregate" refers to any material that imparts surface texture to a dried layer of the resulting exterior finishing composition, preferably, a sand, or, more preferably, a silicon dioxide containing sand. Preferably, the aggregate is present in an amount of from 50 to 70 wt. %, based on dry weight of the formulation.

The dry mix of the present invention refers to the RDP composition or the RDP composition with inorganic dry materials. The dry mix remains shelf stable so long as it is dry. Once wetted or moist, it must be used immediately or it will block or cure and become unusable in later application.

Dry mix compositions or formulations of the present invention may further include a pigment. The pigment may be an inorganic pigment, e.g. a titanium, aluminium, cobalt, copper, iron, chromium, lead, manganese, titanium or tin pigment, or the pigment may be an organic pigment, e.g. carbon black. Preferably, the pigment is an inorganic pigment, more preferably a titanium pigment and most preferably titanium dioxide ($TiO_2$). When present, the dry mix formulation preferably comprises such pigment(s) in an amount no more than 10 wt. %, preferably from 1 to 10 wt. %, based on the total weight of the dry mix formulation.

The dry mix compositions of the present invention may further comprise one or more filler or extender particles. Such filler or extender particles are included to provide opacity to the finishing composition. If present, the filler or extender particles are preferably included in an amount of from 2 to 30 wt. %, more preferably from 4 to 25 wt. %, even more preferably from 10 to 15 wt. %, based on the dry weight of the formulation. Preferred filler or extender products are selected from clay, calcium carbonate, silicates, particularly alumina silicates, talcs, dolomite, silicate minerals, and combinations thereof. Most preferably, the filler or extender particles are selected from calcium carbonate, silicates and combinations thereof.

The dry mix compositions of the present invention may, in addition to the components identified above, comprise one or more conventional additives such as, for example, rheology modifiers, thickeners, defoamers, tinting additives, adhesion promoters, UV stabilizers like benzophenone, preservatives, biocides, mildewcides and/or anti-freeze agents, all of which are well known in the art and are available from commercial sources. These components may be added wet at the time of use or dry prior to use.

The dry mix compositions of the present invention may further comprise a hydrophobic agent. Preferably, the hydrophobic agent is selected from ester or sulfonate compounds comprising a linear or branched alkyl group comprising at least 8, more preferably at least 12 carbon atoms, an aryl or an arylakyl group or salts, preferably sodium, zinc, calcium, potassium or ammonium salts, thereof. Still more preferably the hydrophobic agent is selected from sodium lauryl sulfate (SLS), sodium oleate, sodium stearate, sodium dodecylbenzene sulfonate or a zinc, calcium, potassium or ammonium salt thereof. Still more preferably, the hydrophobic compound is SLS. In such compositions, the hydrophobic agent is preferably present in an amount, based on total polymer solids, of from 0.1 to 10 wt. % more preferably from 0.5 to 7.5 wt. %. This can be added before, during or after atomizing to make the RDP.

In addition to the components recited above, the dry mix compositions of the invention may comprise one or more further components, preferably an additional colloidal stabilizer. In such compositions, the colloidal stabilizer is preferably present in an amount, based on total polymer solids, of no more than 20 wt. %, more preferably no more than 5 wt. %. Suitable and preferred colloidal stabilizers are as indicated, above.

Preferably, an exterior finishing composition (topcoat) in accordance with the present invention comprises the RDP composition and non-cementitious inorganic materials as a dry mix which is wet or mixed with water. This dry mix is combined with from 10 to 30 wt. %, based on the total weight of the exterior finishing composition, of water to make a wet finishing composition. Preferably, the exterior finishing composition is a topcoat in an exterior insulation and finish system (EIFS).

According to a further aspect, the present invention provides a method of using the dry mix compositions of the present invention comprising adding water to the dry mix composition to form a trowellable composition, applying the trowellable composition to a substrate and drying or allowing the applied composition to dry.

Suitable substrates may include but are not limited to, cementitious and non-cementitious substrates such as concrete, brick, stucco, masonry, EIFS, plywood, oriented strand board, gypsum, fiber-cement, and metal.

The present invention is below further described by way of Examples. All ratios, parts and percentages are expressed by dry weight unless otherwise specified, and all components are of good commercial quality unless otherwise specified.

EXAMPLES

As shown below in Table 2, the following materials were used to prepare the multi-stage acrylic copolymers in the Examples, below:

TABLE 2

| Name | Composition |
| --- | --- |
| MOWIOL ™,[2] 4-88 Solution | polyvinyl alcohol (86.7 to 88.7% hydrolysed, $M_W$~31K (20 wt. %) |
| PLURONIC ™,[4] L-31 | ethylene oxide-propylene oxide-ethylene oxide block copolymer |
| TEXANOL ™,[3] | 2,2,4-trimethyl-1,3-pentanediol monoisobutyrate |
| TRITON ™,[1] X-15 | ethylene glycol octylphenyl ether; HLB = 1.5 |
| VERSENE ™,[1] | EDTA, tetrasodium salt |
| WINNOFIL ™,[5] S | $CaCO_3$ coated with stearic acid |
| DEQUEST ™ 2016[6] | 1-Hydroxyethylene-1,1,-diphosphonic acid sodium salt ($Na_4HEDP$) |

[1] Dow Chemical Co., Midland, MI;
[2] Kuraray America, Inc., Houston, TX;
[3] Eastman Chemical, Kingsport, TN;
[4] BASF Ag Florham Park, NJ;
[5] Solvay Advanced Functional Materials, Houston, TX;
[6] Italmatch Chemicals Redbank, NJ.

Emulsions A and B were each made by an inverse two-stage process in which alkali soluble resin was prepared prior to polymerization of the inner stage copolymer in the presence of the alkali soluble resin.

Synthesis of Emulsion A:

To a 50 L reactor equipped with a mechanical stirrer, thermocouple, condenser and a stainless steel feed ports was charged with 2176 g of deionized (DI) water at ambient temperature (18° C.). A monomer emulsion#1 (ME1) as shown in Table 1-1 below, was transferred with a FMI (Fluid Meter Incorporated, Syosset, N.Y.) pump at its maximum rate into the reactor over ~15 minutes. An additional 104 g DI water rinse was then added to the reactor. With the reactor temperature at 18° C., three separate aqueous solutions of sodium sulfoxylate formaldehyde (SSF), tert-butylhydroperoxide (tBHP) and ferrous sulfate heptahydrate, as shown in Table 1-1 were added sequentially to the reactor. An exothermic reaction was observed within 2-3 minutes, gradually increasing to 54° C. over 18 minutes. After the temperature peaked, two aqueous chaser solutions composed of tBHP and SSF were added to the reactor to reduce residual monomer. After 10 minutes, an aliquot was taken and analyzed for 289 nm (B190 plus), 77 ppm MMA, and pH 2.09. The resulting latex was next treated with a neutralizer solution composed of aqueous solution of sodium hydroxide and calcium hydroxide to afford slightly soluble copolymer with a semi-transparent solution (pH=11).

TABLE 1-1

| Monomer Emulsion #1 (ME1) | Wt (gm) |
| --- | --- |
| DI water | 1106 |
| Dequest ™ 2016 acid salt | 0.137 |
| sodium dodecylbenzenesulfonate (NaDBS) | 3.44 |
| Texanol ™ nucleating agent | 90.7 |
| methyl methacrylate (MMA) | 711.0 |
| allyl methacrylate (ALMA) | 13.82 |
| glacial methacrylic acid (MAA) | 181.2 |
| methyl 3-mercapto propionate (MMP) | 31.64 |

| Solutions | | | | | |
| --- | --- | --- | --- | --- | --- |
| Activator | Wt (gm) | Initiator | Wt (gm) | Promoter | Wt (gm) |
| SSF | 11.50 | tBHP | 17.86 | $FeSO_4$—7 $H_2O$ | 0.106 |
| DI Water | 116 | DI Water | 91 | EDTA, Tetrasodium Salt | 0.132 |
| | | | | DI Water | 23 |
| Chase Activator | | | | | |
| SSF | 2.01 | tBHP | 2.87 | | |
| DI Water | 45 | DI Water | 110 | | |

TABLE 1-1-continued

| Neutralizer (Stage 1) | Wt (gm) |
|---|---|
| DI Water | 470 |
| sodium hydroxide (50 wt. % water) | 109.4 |
| calcium hydroxide | 51.9 |

After 15 minutes and the reactor temperature at 50° C., 1098 g of monomer emulsion (ME2), as shown in Table 1-2, was added to the reactor followed by the addition of an aqueous ammonium persulfate (APS) initiator solution and an aqueous sodium metabisulfite solution (NaMBS). An exothermic reaction was observed within 2 minutes, gradually increasing to 65° C. in 10 minutes. After the temperature peaked, the gradual addition of ME2, an aqueous ammonium persulfate solution (cofeed initiator solution) and a sodium metabisulfite (NaMBS) solution (cofeed activator solution) were added at 60.38, 3.36 and 4.07 g/min, respectively. After 10 minutes, these feeds were increased to 90.57, 5.04 and 6.11 g/min, respectively. After an additional 10 minutes, these feeds were increased to 120.76, 6.71 and 8.15 g/min, respectively. After 8781 g of ME2 had been fed to the reactor, 38.41 gm of ALMA was added to ME2 followed by 45 g DI Water. Total feed time was 90 minutes and the reaction temperature was maintained between 65-67° C. After these feeds were completed, 415 g of DI Water was used to rinse the ME2 to the reactor and 45 g of DI Water was used to rinse each of the cofeed solutions to the reactor. After these rinses had been fed to the reactor, aqueous solutions of tBHP and SSF were feed to the latex over 20 minutes while cooling the latex to 50° C. At 50° C., a biocide (Kordek™ LX5000, Dow Chemical, Midland, Mich.) was added to the latex and the latex was isolated and analyzed: 47.28% Solids; pH 6.90: 262 nm average particle size (B190 plus), a viscosity of 289 cPs (LV#2/60 rpms), 11 ppm MMA and 227 ppm BA.

TABLE 1-2

| ME2 | Wt (gm) | Initiator | Wt (gm) | Cofeed Initiator Solution | Wt (gm) |
|---|---|---|---|---|---|
| DI water | 2151.5 | APS | 13.59 | APS | 21.23 |
| Dequest™ 2016 acid salt | 1.16 | DI WATER | 114 | tBHP | 0.68 |
| Mowiol™ 4-88 solution (20% wt) | 1075.4 | | | DI water | 566 |
| sodium lauryl sulfate (SLS) | 55.5 | | | | |

| | Activator | | Cofeed Activator Solution | |
|---|---|---|---|---|
| butyl acrylate (BA) | 4640.1 | | | |
| MMA | 3046.8 | NaMBS | 9.78 | NaMBS | 32.11 |
| MMP | 5.79 | DI Water | 114 | DI Water | 681 |

Synthesis of Emulsion B:

This emulsion was prepared in accordance with the procedure described Example A, except the weight ratio of ME1 and ME2 was changed from 10:90 to 12.5:87.5. To a 50 L reactor equipped with a mechanical stirrer, thermocouple, condenser and a stainless steel feed ports was charged with 1957 g of deionized (DI) water at ambient temperature (18° C.). A monomer emulsion#1 (ME1) as shown in Table 1-1 below, was transferred with a FMI (Fluid Meter Incorporated, Syosset, N.Y.) pump at its maximum rate into the reactor over ~15 minutes. An additional 217 g DI water rinse was then added to the reactor. With the reactor temperature at 23.9° C., three separate aqueous solutions of sodium sulfoxylate formaldehyde (SSF), tert-butylhydroperoxide (tBHP) and ferrous sulfate heptahydrate, as shown in Table 2-1 were added sequentially to the reactor. An exothermic reaction was observed within 2-3 minutes, gradually increasing to 58.6° C. over 23 minutes. After the temperature peaked, two aqueous chaser solutions composed of tBHP and SSF were added to the reactor to reduce residual monomer. After 10 minutes, an aliquot was taken and analyzed for 304 nm (B190 plus), 123 ppm MMA, and pH 2.37. The resulting latex was next treated with a neutralizer solution composed of aqueous solution of sodium hydroxide and calcium hydroxide to afford slightly soluble copolymer with a semi-transparent solution and a pH 11.

TABLE 2-1

| Monomer Emulsion #1 (ME1) | Wt (gm) |
|---|---|
| DI water | 1261 |
| Dequest™ 2016 acid salt | 0.165 |
| sodium dodecylbenzenesulfonate (NaDBS) | 4.13 |
| Texanol™ nucleating agent | 108.9 |
| methyl methacrylate (MMA) | 853.8 |
| allyl methacrylate (ALMA) | 16.59 |
| glacial methacrylic acid (MAA) | 217.6 |
| methyl 3-mercapto propionate (MMP) | 37.99 |

| Solutions | | | | | |
|---|---|---|---|---|---|
| Activator | Wt (gm) | Initiator | Wt (gm) | Promoter | Wt (gm) |
| SSF | 11.05 | tBHP | 17.15 | $FeSO_4$—7 $H_2O$ | 0.102 |
| DI Water | 133 | DI Water | 86 | EDTA, Tetrasodium Salt | 0.127 |
| | | | | DI Water | 43 |

| Chase Activator | | | |
|---|---|---|---|
| SSF | 1.93 | tBHP | 2.75 |
| DI Water | 108 | DI Water | 65 |

| Neutralizer (Stage 1) | Wt (gm) |
|---|---|
| DI Water | 522 |
| sodium hydroxide (50 wt. % water) | 131.4 |
| calcium hydroxide | 62.3 |

After 15 minutes and the reactor temperature at 63.8° C., 1054 g of monomer emulsion (ME2), as shown in Table 1-2, was added to the reactor followed by the addition of an aqueous ammonium persulfate (APS) initiator solution and an aqueous sodium metabisulfite solution (NaMBS). An exothermic reaction was observed within 2 minutes, gradually increasing to 75.4° C. in 6 minutes. After the temperature peaked, the gradual addition of ME2, an aqueous ammonium persulfate solution (cofeed initiator solution) and a sodium metabisulfite (NaMBS) solution (cofeed activator solution) were added at 58.4, 3.10 and 3.91 g/min, respectively. After 10 minutes, these feeds were increased to 87.6, 4.65 and 5.87 g/min, respectively. After an additional 10 minutes, these feeds were increased to 116.76, 6.21 and 7.83 g/min, respectively. After 8433 g of ME2 had been fed to the reactor, 36.89 gm of ALMA was added to ME2 followed by 109 g DI Water. Total feed time was 90 minutes and the reaction temperature was maintained between 71-73° C. After these feeds were completed, 434 g of DI Water was used to rinse the ME2 to the reactor and 44 g of DI Water was used to rinse each of the cofeed solutions to the reactor. After these rinses had been fed to the reactor, aqueous solutions of tBHP and SSF were feed to the reactor over 20 minutes while cooling the latex to 50° C. At 50° C., a biocide (KORDEK™ LX5000, Dow Chemical, Midland, Mich.) was added to the latex and the latex was isolated and analyzed: 47.24% Solids; pH 7.29: 269 nm average particle size (B190 plus), a viscosity of 263 cPs (LV#2/60 rpms), 5 ppm MMA and 13 ppm BA.

TABLE 2-2

| ME2 | Wt (gm) | Initiator | Wt (gm) | Cofeed Initiator Solution | Wt (gm) |
|---|---|---|---|---|---|
| DI Water | 1684.4 | APS | 13.05 | APS | 20.39 |
| Dequest™ 2016 | 1.12 | DI WATER | 130 | tBHP | 0.66 |
| MOWIOL™ 4-88 solution (15% wt) | 1415.2 | | | DI water | 522 |
| sodium lauryl sulfate (SLS) | 53.3 | | | | |

| | Activator | | Cofeed Activator Solution | |
|---|---|---|---|---|
| butyl acrylate (BA) | 4457.1 | | | |
| MMA | 2926.6 | NaMBS | 9.39 | NaMBS | 30.84 |
| MMP | 3.90 | DI Water | 130 | DI Water | 654 |

Emulsion C:

This emulsion was prepared in accordance with the procedure described Example A, except the weight ratio of ME1 and ME2 was changed from 10:90 to 15:85. To a 5 L reactor equipped with a mechanical stirrer, thermocouple, condenser and a stainless steel feed ports was charged with 464 g of deionized (DI) water at ambient temperature (22° C.). A monomer emulsion#1 (ME1) as shown in Table 1-1 below, was transferred with a FMI (Fluid Meter Incorporated, Syosset, N.Y.) pump at its maximum rate into the reactor over ~15 minutes. An additional 33 g DI water rinse was then added to the reactor. With the reactor temperature at 22° C., three separate aqueous solutions of sodium sulfoxylate formaldehyde (SSF), tert-butylhydroperoxide (tBHP) and ferrous sulfate heptahydrate, as shown in Table 3-1 were added sequentially to the reactor. An exothermic reaction was observed within 2-3 minutes, gradually increasing to 56° C. over 18 minutes. After the temperature peaked, two aqueous chaser solutions composed of tBHP and SSF were added to the reactor to reduce residual monomer. After 10 minutes, the resulting latex was next treated with a neutralizer solution composed of aqueous solution of sodium hydroxide and calcium hydroxide to afford slightly soluble copolymer with a semi-transparent solution and a pH 11.

TABLE 3-1

| Monomer Emulsion #1 (ME1) | Wt (gm) |
|---|---|
| DI Water | 354 |
| Dequest ™ 2016 acid salt | 0.044 |
| sodium dodecylbenzenesulfonate (NaDBS) | 0.92 |
| Texanol ™ nucleating agent | 29.0 |
| methyl methacrylate (MMA) | 227.4 |
| allyl methacrylate (ALMA) | 4.42 |
| glacial methacrylic acid (MAA) | 58.0 |
| methyl 3-mercapto propionate (MMP) | 10.12 |

TABLE 3-1-continued

| Solutions | | | | | |
|---|---|---|---|---|---|
| Activator | Wt (gm) | Initiator | Wt (gm) | Promoter | Wt (gm) |
| SSF | 3.68 | tBHP | 5.71 | $FeSO_4$—7 $H_2O$ | 0.023 |
| DI Water | 40 | DI Water | 32 | EDTA, Tetrasodium Salt | 0.028 |
| | | | | DI Water | 10 |

| Chase Activator | | | | |
|---|---|---|---|---|
| SSF | 0.63 | tBHP | 0.44 | |
| DI Water | 10 | DI Water | 28 | |

| Neutralizer (Stage 1) | Wt (gm) |
|---|---|
| DI Water | 151 |
| sodium hydroxide (50 wt. % water) | 35.0 |
| calcium hydroxide | 16.6 |

After 15 minutes and the reactor temperature at 56° C., 234 g of monomer emulsion (ME2), as shown in Table 3-2, was added to the reactor followed by the addition of an aqueous ammonium persulfate (APS) initiator solution and an aqueous sodium metabisulfite solution (NaMBS). An exothermic reaction was observed within 2 minutes, gradually increasing to 63° C. in 22 minutes. After the temperature peaked, the gradual addition of ME2, an aqueous ammonium persulfate solution (cofeed initiator solution) and a sodium metabisulfite (NaMBS) solution (cofeed activator solution) were added at 12.8, 0.74 and 0.74 g/min, respectively. After 10 minutes, these feeds were increased to 19.2, 1.11 and 1.11 g/min, respectively. After an additional 10 minutes, these feeds were increased to 25.6, 1.48 and 1.48 g/min, respectively. After 1860 g of ME2 had been fed to the reactor, 8.19 gm of ALMA was added to ME2 followed by 10 g DI Water. Total feed time was 90 minutes and the reaction temperature was maintained between 64-66° C. After these feeds were completed, 100 g of DI Water was used to rinse the ME2 to the reactor and 20 g of DI Water was used to rinse each of the cofeed solutions to the reactor. After these rinses had been fed to the reactor, aqueous solutions of tBHP and SSF were feed to the latex over 20 minutes while cooling the latex to 50° C. At 50° C., a biocide (Kordek LX5000, Dow Chemical, Midland, Mich.) was added to the latex and the latex was isolated and analyzed: 46.26% Solids; pH 7.45: 127 nm average particle size (B190 plus), a viscosity of 178 cPs (LV#2/60 rpms), 0 ppm MMA and 26 ppm BA.

TABLE 3-2

| ME2 | Wt (gm) | Initiator | Wt (gm | Cofeed Initiator Solution | Wt (gm |
|---|---|---|---|---|---|
| DI Water | 382 | APS | 2.90 | APS | 4.53 |
| Dequest™ 2016 acid salt | 0.25 | DI Water | 25 | tBHP | 0.15 |
| Mowiol ™ 4-88 solution (15% wt) | 306.0 | | | DI water | 130 |
| sodium lauryl sulfate (SLS) | 11.8 | | | | |

| | Activator | | Cofeed Activator Solution | |
|---|---|---|---|---|
| butyl acrylate (BA) | 989.5 | | | |
| MMA | 649.7 | NaMBS | 2.09 | NaMBS | 6.85 |
| MMP | 1.24 | DI Water | 25 | DI Water | 130 |

RDP Synthesis Examples

At ambient temperature, the emulsions indicated in Table 5, below, were mixed with the indicated amounts of calcium hydroxide and water in Table 5, below, to give neutralized emulsions having the indicated pH and solids content. Except for Example 8, the neutralized emulsions were then spray dried using a Niro Atomizer Spray Dryer (GEA Process Engineering Inc., Columbia, Md.) laboratory spray dryer equipped with a nozzle (SU4 from Spray Systems Company, Wheaton, Ill.) in the spray drying conditions with tolerances for uncertainty shown in Table 4, below, to give the water redispersible polymer powders indicated in Table 6, below. Example 8 was prepared in pilot dryer in which spray drying conditions were not optimized. Unless otherwise specified, in all aqueous dispersions in Table 5, below, an anti-caking agent of nepheline syenite (MINEX™7, median particle size 3.1 microns, or MINEX™10, median particle size 2.1 microns, Unimin Specialty Minerals Inc., New Canaan, Conn.) was included in the amount given in Table 4, below.

The resulting free-flowing powders were evaluated for % moisture, % ash content, and redispersibility by resistance to sedimentation and dispersion viscosity and the results were compiled in Table 6, below.

TABLE 4

| Temperature | | | | Anti-Caking |
|---|---|---|---|---|
| Inlet | Outlet | Air Flow | Latex | Aid |
| 170-180° C. | 62-64° C. | 6.0-6.2 kg/cm² | 55-65 gm/min | 2.9-3.5 gm/min |

TABLE 5

Aqueous Dispersions

| EXAMPLE RDP ID# | Emulsion | Latex (gm) | Calcium Hydroxide (gm) | $H_2O$ (gm) | pH | % Solids | Flow Aid (gm) |
|---|---|---|---|---|---|---|---|
| 1 | A | 4169.0 | 25.68 | 1510 | 11 | 35.00% | 137.1[1] |
| 2 | A | 1008.31 | 7.76 | 359 | 11 | 35.20% | 71.5[1] |
| 3 | B | 1068.84 | 5.63 | 359 | 11 | 34.43% | 79.0[1] |
| *4 | C | 1014.75 | 0.00 | 609.00 | 7.26 | 29.80% | 74.6[1] |
| 5 | C | 978.42 | 6.07 | 359 | 11 | 35.10% | 69.7[1] |
| 6 | A | 1000.0 | 7.69 | 600 | 11 | 29.89% | 54.3 Minex 10 |
| 7 | A | 1000.0 | 7.69 | 600 | 11 | 29.89% | 58.6 Minex 10 |
| 8 | A | 19,000 | 146.2 | 4700 | 11 | 38.28% | 1158.2[1] |

*Denotes Comparative Example;
[1]Minex™ 7.

% Moisture:

The RDP of each Example was measured using a Denver Instruments IR35 moisture balance (Bohemia, N.Y.) by placing 1 gm±0.2 gm of powder on the aluminum weigh pan provided and measuring the % water lost after 10 minutes at 105° C. % Moisture level is dependent on the spray drying conditions, but the preferred level is between 1.5-2.5%.

% Ash Content:

The RDP of each Example was measured using a TGA701 Thermogravimetric Analyzer (LECO Corporation, St. Joseph, Mich.). For each Example 3-5 g of powder was placed in a dry porcelain crucible and heat to 825° C. The % Ash content is the difference between the weight of the ash and the initial weight of the sample. For MINEX 7 nepheline syenite, the ash content is 99.5%. For MINEX 10 nepheline syenite, the ash content is ~99.5%. The preferred ash content is between 5-20%, and preferably between 10-14%.

Sedimentation & Dispersion Viscosity:

The RDP of each Example was redispersed by mixing 50 gm equal weights of RDP and water for 30 minutes using a standard stainless steel agitator and an IKW RW 20 Digital Stirrer (Wilmington, N.C.) at 400 rpm. The viscosity of the resulting paste was measured using a Brookfield viscometer with a LV#4 spindle (Brookfield Engineering, Middleboro, Mass.) at 60 rpms. A higher the dispersion viscosity indicates increased redispersibility. The resulting paste was then let down with additional water, 1 part paste to 90 parts water. Sedimentation indicates the dispersion stability of the aqueous redispersed powder, where optimum sedimentation is 0 mm after 24 hours. Sedimentation analysis was conducted using a 0.5 mm diameter X 45 cm in length burette modified with a flat base containing graduation in mm vs mL. Preferably, the level of sedimentation is ≤20 mm after 24 hours, preferably, ≤10 mm after 24 hours.

TABLE 6

RDP Evaluations

| RDP Example | Emulsion | % $H_2O$ | Ash Content | RDP Sedimentation (mm 24 hr.) | RDP Dispersion Viscosity (LV#4) |
|---|---|---|---|---|---|
| 1 | A | 1.77% | 14.20% | 28 mm | |
| 2 | A | 2.10% | 12.92% | 22 mm | 5500 cps |
| 3 | B | 2.39% | 13.31% | 11 mm | |
| *4 | A | 1.36% | 13.33% | 38 mm | 500 cps |
| 5 | C | 2.44% | 13.23% | 10 mm | >10,000 cps |
| 6 | A | 1.73% | 10.45% | 16 mm | |
| 7 | A | 2.31% | 11.12% | 25 mm | |
| 8 | A | 2.02% | 11.59% | 27 mm | 920 cps |

*Denotes Comparative Example.

A shown in Table 6, above, all of the inventive Examples 1 to 3 and 5 to 8 gave acceptable sedimentation or redispersibility, or gave substantially better redispersibility than did Comparative Example 4. Increased RDP dispersion viscosity corresponds to lower sedimentation and increased redispersibility of the RDP. Spray drying conditions were not optimized in making the Example 8 RDP.

Method of Making Dry Anionic Associative Thickener for Blending:

All aqueous anionic associative thickeners were made or obtained and used as received without any adjustment for % solids content nor pH. At ambient temperature, the indicated anionic associative thickener (Table 7A, below) was spray dried using a Niro Atomizer Spray Dryer (GEA Process Engineering Inc., Columbia, Md.) laboratory spray dryer equipped with a nozzle (SU4 or SU5 from Spray Systems Company, Wheaton, Ill.). Unless otherwise indicated, no additional colloidal stabilizer was used. Spray drying conditions, with tolerances for uncertainty were as shown in Table 7, below. In these examples, no anti-caking aid was used unless specified. The resulting free-flowing powders were recovered in 60-95 wt. % of the original material to be dried.

TABLE 7

| Temperature | | | | Anti-Caking |
|---|---|---|---|---|
| Inlet | Outlet | Air Flow | Latex | Aid |
| 180-200° C. | 64-70° C. | 6.0-6.2 kg/cm$^2$ | 40-65 gm/min | None |

TABLE 7A

| Associative Thickener | Wt (gm) | % Solids | pH | Recovery (%) | Moisture (%) |
|---|---|---|---|---|---|
| A[1] | 2039.0 | 28% | 2.4 | 72.5% | 3.03% |
| B[2] | 1000 | 30.0% | 2.70 | 91.0% | 2.19% |

[1]Copolymer of 60 wt. % ethyl acrylate, 39.5 wt % methacrylic acid and 0.5 wt. % diallyl phthalate;
[2]Copolymer of 49 wt. % ethyl acrylate, 37 wt. % methacrylic acid and 14 wt. % stearyl polyethylene glycol methacrylate.

Examples 10-12

Co-Spray Drying of Anionic Associative Thickener and Multi-Stage Acrylic Copolymer At ambient temperature, 1008.3 gm of Emulsion A was treated with 6.28 gm of calcium hydroxide and 400 gm of water to give an emulsion having a pH 10.5-12 and a solids content of ~35%. This neutralized emulsion polymer was then treated with 22.6 gm of anionic associative thickener A (copolymer of 60 wt. % ethyl acrylate, 39.5 wt % methacrylic acid and 0.5 wt. % diallyl phthalate) or anionic associative thickener B (copolymer of 49 wt. % ethyl acrylate, 37 wt. % methacrylic acid and 14 wt. % stearyl polyethylene glycol methacrylate) with agitation and was spray dried using a Niro Atomizer Spray Dryer (GEA Process Engineering Inc., Columbia, Md.) equipped with a nozzle (SU4 or SU5 from Spray Systems Company, Wheaton, Ill.). MINEX 10 nepheline syenite was feed to the spray dryer in a separate port at a rate of 2.9-3.5 gm/min. Unless otherwise indicated, no additional colloidal stabilizer was used. Data is presented in Table 8, below.

Comparative Example 9

At ambient temperature, 4169.0 gm of Emulsion A was treated with an aqueous slurry composed of 25.68 gm of calcium hydroxide and 1510 gm of water to give an emulsion having a pH 10.5-12 and a solids content of ~35%. The neutralized emulsion was then spray dried using a Niro Atomizer Spray Dryer (GEA Process Engineering Inc., Columbia, Md.) laboratory spray dryer equipped with a nozzle (SU4 or SU5 from Spray Systems Company, Wheaton, Ill.). MINEX 10 nepheline syenite was fed to the spray dryer in a separate port at a rate of 2.9-3.5 gm/min. Unless otherwise indicated, no additional colloidal stabilizer was used. Data for this example is presented in Table 8, below.

TABLE 8

| | RDP Characterization | | | | |
|---|---|---|---|---|---|
| Example | Anionic associative thickener | % Moisture | Recovery | Sedimentation | % ACA |
| 10 | A | 2.29% | 54.2% | Not Measured | N/A |
| 11 | B | 2.19% | 91.0% | Not Measured | N/A |
| *12 | Emulsion A + 1.25% A(dry wts) | 2.24% | 70.1% | Not Redispersible 50 mm 24 hr. | 11.9% |
| *9 | Emulsion A only | 1.77% | 80.4% | 28 mm 24 hr. | 14.3% |

*Denotes Comparative Example

The Example 12 composition did not give a redispersible powder, thus showing that the preferred method to make the compositions of the present invention is to blend dry anionic associative thickener with an RDP rather than dry them together.

Examples 10 and 11 demonstrate only the making of dry associative thickener.

The performance of the compositions of the present invention were evaluated in the various formulations indicated below.

77 PVC Dry EIFS Formulations:

The indicated water redispersible polymer powder or RDP from Table 6, above, and the indicated dry anionic associative thickener from Table 7A, above, were formulated into non-cementitious textured paint formulations for use in EIFS as indicated in Tables 10 to 13, below. In each test, a dry mix formulation was prepared comprising: 12.76 wt. % of the indicated RDP, 6.68 wt. % #15 sand; 54.29 wt. % 50-30 sand; 4.66 wt. % DURAMITE™ ($CaCO_3$ extender, Imerys Pigments, Inc., Roswell, Ga.); 0.50 wt. % METOLAT™ P 871 (neopentyl glycol-containing anti shrink coalescent, Munzing, Del.); 0.10 wt. % WALOCEL™ MKX 6000 PF01 (hydroxyethylmethylcellulose ether thickener, The Dow Chemical Company, Midland, Mich.); 0.25 wt. % ATTAGEL 50™ (clay-containing rheology modifier, BASF, Leverkusen, Del.); 0.07 wt. % of #6 Denier MiniFibers (fiberglass, ~0.6 cm cut); 0.25 wt. % AGITAN™ P 804 (defoamer, Munzing, Del.); 3.76 wt. % TI-PURE™ R-960 ($TiO_2$ pigment, Dupont, Wilmington, Del.); 0.25 wt. % BIOBAN™ IBPC 100 (a biocide, Dow Chemical Company); and 0.17 wt. % of potassium tripolyphosphate dispersant. The textured paint compositions were prepared by admixing the dry mix formulations with an additional 16.26 wt. %, of water at the point of use, all wt. % s based on the total weight of the compositions.

Viscosity:

Measured using a Krebs Stormer Model KU-1 viscometer (Brookfield Engineering, Middleboro, Mass.). All measurements conducted at ambient temperature conditions with a paste paddle; and units are PU (paste units). Preferred past unit values are 110-140, more preferably between 125-135 paste units.

Trowellability Assessment:

Trowellability/workability is assessed qualitatively by trowelling the EIFS finish onto a 12"×12" EIFS panel with cured cementitious basecoat on EPS (w/embedded fiberglass mesh) and rating on a 1 to 10 scale for handling/application properties (1=very poor, 2-3=poor, 4-5=fair, 6-7=good, 8=very good, 9-10=excellent). The target latex system based on Rhoplex E1-2000 has an excellent rating of 10.

"Spatula Sticking" Test:

A more quantitative assessment of rheology/handling is carried out by first placing 600 grams of wet finish into a one-pint cylindrical polyethylene container (dia=8.9 cm; liquid depth=7.6"), mixing thoroughly for 30", and then allowing the liquid to equilibrate for 1'. The container is then placed on a tared Mettler balance capable of reading to two decimal places, and a clean 1"×6" round-tipped metal spatula (with wooden handle) is inserted vertically into the center of the liquid until it touches the container bottom. After 5" of resting the tip of the spatula on the bottom of the container, the spatula is rotated 180° and held for another 5", after which time it is removed and held approximately 4" above the container opening for 5" more. The weight change (initial value) immediately upon removal of the spatula from the container is a measure of the amount of material sticking to the spatula (lower amounts are better), and the container weight after 5" (delta) is a measure of the looseness or "drippiness" of the material. Initial value should be as low as possible; below 18 g is acceptable. Preferred delta value is less than 4; more preferably the value is 0, indicating a lower propensity for trowelled material to drip or slide from a desired trowelled area. The data are presented in Tables 10, 11, 12 and 13, below.

TABLE 10

77 % PVC Workability Test Results (Acrylic RDP #1):

| Example 10 | | | | Trowellability Assessment | | Spatula Sticking (g) | |
|---|---|---|---|---|---|---|---|
| RDP | Rheological[1] Additive | Water Level | (PU) Viscosity | Rating | Comment | Initial | Delta |
| *1 | 1% MKX 6K | 16.26% | 128 | 5 | Fair | 20.84 | 5.43 |
| 1 | 1% A | 16.26% | 127 | 9 | Excellent | 18.17 | 0 |
| 1 | 0.5% B | 16.26% | 130 | 9 | Excellent | 15.16 | 0 |
| *1 | 1% MKX 6K | 16.67% | 123 | 4 | Fair | 22.61 | 8.56 |
| 1 | 1% A | 16.67% | 124 | 10 | Excellent | 19.28 | 0 |
| 1 | 0.5% B | 16.67% | 126 | 10 | Excellent | 17.85 | 0 |
| *1 | 1% MKX 6K | 17.07% | 115 | 3 | Poor | 22.08 | 9.72 |
| 1 | 1% A | 17.07% | 120 | 9 | Excellent | 19.12 | 0 |
| 1 | 0.5% B | 17.07% | 121 | 9 | Excellent | 18.91 | 0 |
| *1 | 1% MKX 6K | 17.89% | 110 | 1 | Very Poor | 21.76 | 11.23 |
| 1 | 1% A | 17.89% | 115 | 7 | Good | 19.11 | 0 |
| 1 | 0.5% B | 17.89% | 116 | 8 | Very Good | 19.25 | 0 |

[1]Level expressed as wt. % on RDP solids (MKX 6K = Walocel MKX 6000 PF01);
*denotes Comparative Example.

TABLE 11

77% PVC Workability Test Results (Acrylic RDP #2):

| Example 11 | | | | Trowellability Assessment | | Spatula Sticking (g) | |
|---|---|---|---|---|---|---|---|
| RDP | Rheological[1] Additive | Water Level | (PU) Viscosity | Rating | Comment | Initial | Delta |
| *2 | 1% MKX 6K | 16.26% | 128 | 6 | Good | 21.20 | 1.21 |
| 2 | 1% A | 16.26% | 129 | 9 | Excellent | 17.92 | 0 |
| *2 | 1% MKX 6K | 16.67% | 124 | 6 | Good | 22.48 | 2.43 |
| 2 | 1% A | 16.67% | 124 | 10 | Excellent | 17.41 | 0 |
| *2 | 1% MKX 6K | 17.07% | 118 | 4 | Fair | 21.96 | 6.85 |
| 2 | 1% A | 17.07% | 120 | 9 | Excellent | 19.27 | 0 |
| *2 | 1% MKX 6K | 17.89% | 112 | 1 | Very Poor | 22.00 | 9.80 |
| 2 | 1% A | 17.89% | 114 | 7 | Good | 19.78 | 0 |

[1]Level expressed as wt. % on RDP solids (MKX 6K = Walocel MKX 6000 PF01);
*denotes Comparative Example.

TABLE 12

77 PVC Workability Test Results (Acrylic RDP #3):

| Example 12 | | | | Trowellability | | Spatula Sticking (g) | |
|---|---|---|---|---|---|---|---|
| RDP | Rheological[1] Additive | Water Level | (PU) Viscosity | Rating | Comment | Initial | Delta |
| *3 | 1% MKX 6K | 16.26% | 132 | 6 | Good | 19.85 | 3.02 |
| 3 | 1% A | 16.26% | 134 | 9 | Excellent | 17.67 | 0 |
| *3 | 1% MKX 6K | 16.67% | 127 | 5 | Fair | 23.65 | 5.66 |
| 3 | 1% A | 16.67% | 129 | 9 | Excellent | 18.30 | 0 |
| *3 | 1% MKX 6K | 17.07% | 121 | 3 | Poor | 22.66 | 8.46 |
| 3 | 1% A | 17.07% | 122 | 8 | Very Good | 18.33 | 0 |
| *3 | 1% MKX 6K | 17.89% | 115 | 1 | Very Poor | 23.08 | 10.27 |
| 3 | 1% A | 17.89% | 116 | 6 | Good | 18.97 | 1.11 |

[1]Level expressed as wt. % on RDP solids (MKX 6K = Walocel MKX 6000 PF01);
*denotes Comparative Example.

TABLE 13

Workability Test Result for Wet Acrylic Emulsion Polymer

| Acrylic Latex | Rheological[1] Additive | Water Level | (PU) Viscosity | Trowellability Assessment | | Spatula Sticking (g) | |
|---|---|---|---|---|---|---|---|
| | | | | Rating | Comments | Initial | Delta |
| El-2000[2] | 1.25% A | N/A | 109 | 10 | Excellent | 5.75 | 0 |

[1]Level expressed as active wt. % anionic associative thickener on El-2000 acrylic latex solids;
[2]100% acrylic latex copolymer.

As shown in each of Tables 10, 11 and 12, above, the inventive dry mix RDP compositions exhibit good to excellent workability and consistently lower spatula sticking than the closest art having the same RDP and a cellulosic thickener. While the Table 13 wet formulation is a very difficult benchmark to match, the inventive Examples in Tables 10, 11 and 12 provide similar trowellability to the wet textured paint composition in Table 13. The dry mix compositions of the present invention enable ease of transport and single component dry mixes for either non-cementitious or cementitious compositions.

We claim:

1. A shelf-stable composition for use in dry mix applications comprising a water redispersible polymer powder (RDP) composition containing B) a multi-stage acrylic copolymer RDP and A) from 0.1 to 7.5 wt. %, based on the total weight of A) and B), of a dry anionic associative thickener selected from a hydrophobically modified alkali swellable acrylic emulsion copolymer (HASE), an alkali swellable acrylic emulsion copolymer, and mixtures thereof, the multi-stage acrylic copolymer RDP B) having a calcium methacrylate salt group containing alkali-soluble resin outer stage and one or more inner stage, the RDP further containing each of one or more nucleating agent having a boiling point of 150° C. to 500° C. and a water solubility of 3.5% or less, and one or more colloidal stabilizer,
wherein when the multi-stage acrylic copolymer is dispersed in water the one or more inner stage comprises an acrylic (co)polymer having a glass transition temperature (Tg) of from −10 to 15° C. calculated using the Fox equation,
and the weight ratio of the alkali-soluble resin outer stage to the one or more inner stage(s) ranges from 1:19 to 2:3 and the dry anionic associative thickener, the colloidal stabilizer, the nucleating agent and the multi-stage acrylic copolymer are contained in the same particle.

2. The shelf-stable composition for use in dry mix applications as claimed in claim 1, wherein the amount of the A) dry anionic associative thickener ranges from 0.25 to 2 wt. %, based on the total weight of A) and B).

3. The shelf-stable composition for use in dry mix applications as claimed in claim 1, wherein the A) dry anionic associative thickener is a hydrophobically modified alkali swellable acrylic emulsion copolymer (HASE).

4. The shelf-stable composition for use in dry mix applications as claimed in claim 1, wherein the B) multi-stage acrylic copolymer RDP contains, in copolymerized form, a crosslinking agent in the range of 0.05 to 2.0% wt. %, based on the total weight of the monomers used to make the copolymer.

5. The shelf-stable composition for use in dry mix applications as claimed in claim 1, wherein the B) multi-stage acrylic copolymer RDP contains a chain transfer agent residue, in the range of from 0.05 to 1.0 wt. %, based on the total weight of the monomers and chain transfer agents used to make the copolymer.

6. The shelf-stable composition for use in dry mix applications as claimed in claim 1, wherein the B) multi-stage acrylic copolymer RDP contains from 0.1 to 15 wt. % of the one or more colloidal stabilizer, per 100 weight parts multi-stage acrylic copolymer solids.

7. The shelf-stable composition for use in dry mix applications as claimed in claim 6, wherein the colloidal stabilizer is a poly(vinyl alcohol) (PVOH).

8. The composition as claimed in claim 1, wherein the B) multi-stage acrylic copolymer RDP further comprises one or more hydrophobic agent.

9. The shelf-stable composition for use in dry mix applications as claimed in claim 1, wherein the B) multi-stage acrylic copolymer RDP further comprises one or more anti-caking aid.

10. The shelf-stable composition for use in dry mix applications as claimed in claim 1, further comprising an inorganic dry material selected from a cementitious material and a non-cementitious material.

11. A method of making a water redispersible polymer powder composition comprising providing an aqueous dispersion containing one or more colloidal stabilizer, and a multi-stage acrylic copolymer having an alkali-soluble resin outer stage comprising methacrylic acid groups and one or more inner stage, one or more nucleating agent having a boiling point of 150° C. to 500° C. and a water solubility of 3.5% or less, wherein when the multi-stage acrylic copolymer is dispersed in water the one or more inner stage comprises an acrylic (co)polymer having a glass transition temperature (Tg) of from −10 to 15° C., calculated using the Fox equation, and atomizing the resulting composition in the presence of from 0.75 to 3 wt. % of calcium hydroxide or aqueous lime, based on the total weight of the multi-stage acrylic copolymer solids, to form a water redispersible polymer powder, providing separately an aqueous mixture of an anionic associative thickener selected from a hydrophobically modified alkali swellable acrylic emulsion copolymer (HASE), an alkali swellable acrylic emulsion copolymer or mixtures thereof in the amount of from 0.1 to 7.5 wt. %, based on the total weight of solids in the aqueous mixture and the aqueous dispersion, atomizing the aqueous mixture to form a dry anionic associative thickener and blending the dry anionic associative thickener and the water redispersible polymer powder.

\* \* \* \* \*